J. O. JONES.
Rakes.

No. 143,578. Patented Oct. 14, 1873.

Witnesses.
F. P. Hubbard.
W. E. Boardman.

John O. Jones.
F. Curtis, Atty.

UNITED STATES PATENT OFFICE.

JOHN O. JONES, OF BOSTON, MASSACHUSETTS.

IMPROVEMENT IN RAKES.

Specification forming part of Letters Patent No. 143,578, dated October 14, 1873; application filed April 24, 1873.

*To all whom it may concern:*

Be it known that I, JOHN O. JONES, of Boston, Suffolk county, Massachusetts, have invented certain Improvements in Rakes, of which the following is a specification:

This invention consists in a rake formed of two oppositely-disposed heads or rows of teeth, the bases or heads of which meet and unite, and the points diverge, the whole being constructed as hereinafter described, the object being to combine in one implement two rakes of different grades, or a coarse and fine rake.

Figure 1:
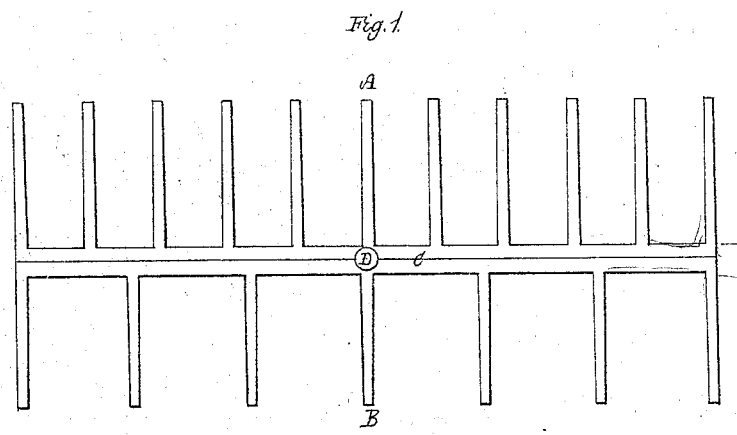
Figure 2:
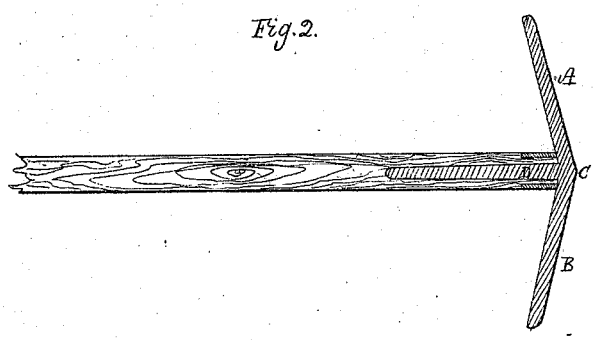

The drawings accompanying this specification represent, in Figure 1, a plan, and in Fig. 2 a cross-section, of a rake constructed in accordance with the principle of my invention.

In these drawings, A B represent two rows of teeth, all placed in the same longitudinal plane or direction, and with their bases united to a common bar, C, one row or set of teeth departing from this bar at right angles to its longest plane in one direction, and the other row of teeth also departing from such bar at right angles to its longest plane in the opposite direction, the whole being preferably produced by casting it in one entire casting of malleable iron. The inner faces of the two sets of teeth are placed at an oblique angle to each other to obtain the ordinary form of rake; and a shank or prong, D, is also cast with the rest of the rake, and projects centrally from the bar C, as shown in Fig. 2 of the drawings.

The utility of my invention will be at once apparent when it is seen that by simply reversing the rake a fine or coarse set of teeth is provided, which practically constitutes two rakes, while my double rake may be made and sold at the price of those at present in use.

I claim—

A hand rake-head formed of metal in one casting or piece, consisting of the two rows of teeth A B, the one fine, the other coarse, the central bar C, and the shank D, the same being constructed and adapted to be applied to a suitable handle, as herein shown and set forth.

JOHN O. JONES.

Witnesses:
F. CURTIS,
W. E. BOARDMAN.